United States Patent
Frank

[15] 3,698,100
[45] Oct. 17, 1972

[54] OPERATOR RESPONSIVE PROGRAMMED LEARNING APPARATUS

[72] Inventor: Lee F. Frank, Rochester, N.Y.

[73] Assignee: Eastman Kodak Company, Rochester, N.Y.

[22] Filed: Jan. 25, 1971

[21] Appl. No.: 109,276

[52] U.S. Cl. ................................................35/9 A
[51] Int. Cl. .............................................G09b 7/08
[58] Field of Search .........35/9 R, 9 A, 9 B, 8 R, 8 A, 35/22 R

[56] References Cited

UNITED STATES PATENTS

| | | | |
|---|---|---|---|
| 3,596,376 | 8/1971 | Avedissian | 35/22 R |
| 3,137,948 | 6/1964 | Wyckoff | 35/9 A |
| 3,382,588 | 5/1968 | Serrell et al | 35/9 A |
| 3,522,664 | 8/1970 | Lambright et al | 35/8 R |

*Primary Examiner*—Wm. H. Grieb
*Attorney*—R. W. Hampton, P. R. Holmes and R. W. Weig

[57] ABSTRACT

In a rear projection viewer for showing a programmed viewing web having encoded frames thereon, light beams are directed across the face of a display screen onto photodetectors located about its periphery. A student can indicate a response to a projected answer coded scene, such as a question, by presenting a finger or other object at the face of the display screen at a selected answer point, thereby interrupting a light beam or beams. The photodetectors are connected to correlating circuitry which compares the student's response with information coded on the scene's frame. The next scene presented is program selected in accordance with what response the student registered.

13 Claims, 8 Drawing Figures

PATENTED OCT 17 1972 3,698,100
SHEET 1 OF 6
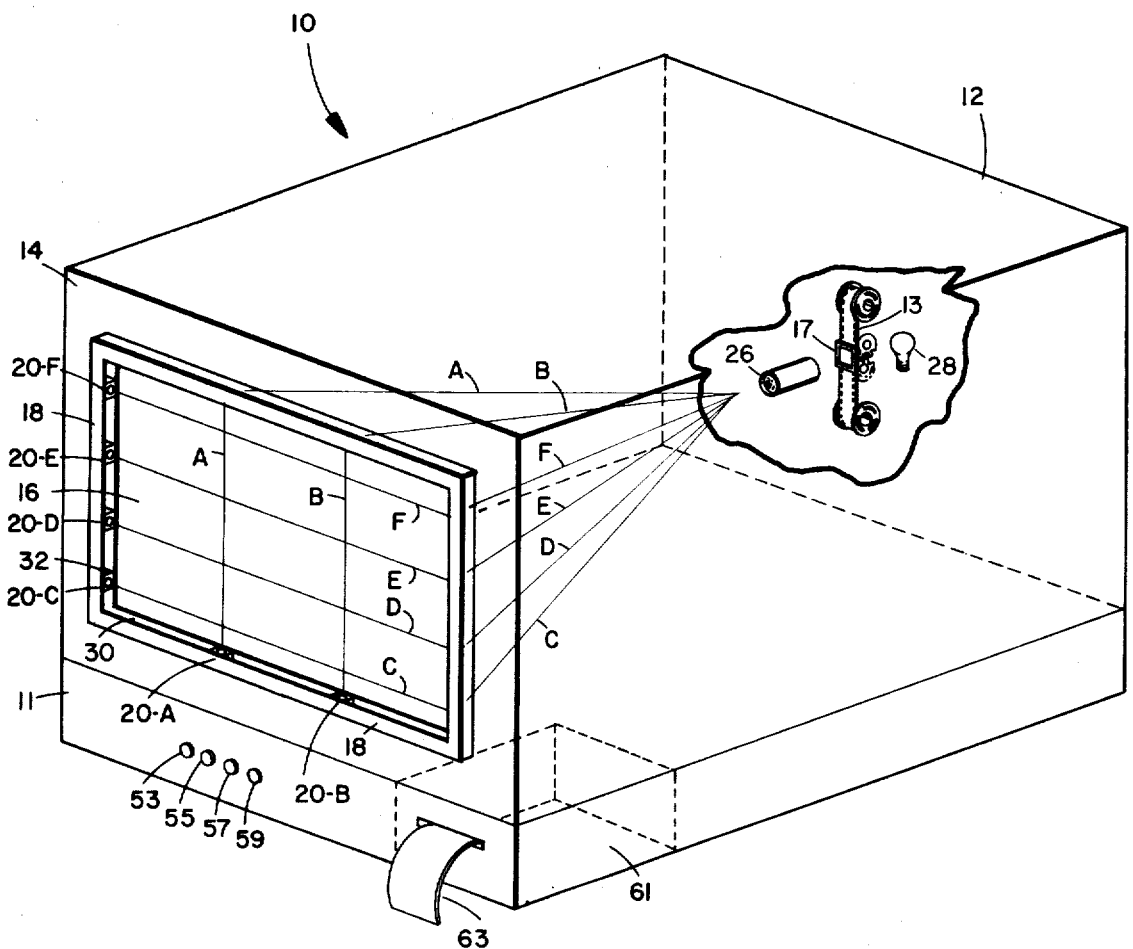
FIG. I
LEE F. FRANK
INVENTOR.
BY Robert W. Weiz
AGENT

LEE F. FRANK
INVENTOR.

BY Robert W. Weig

AGENT

OPERATOR RESPONSIVE PROGRAMMED LEARNING APPARATUS

FIELD OF THE INVENTION

This invention relates to educational devices and more particularly to a programmed learning apparatus wherein in response to a projected frame, a student interrupts light paths crossing the viewing screen to sequence the device in accordance with the student response and the program.

BACKGROUND OF THE INVENTION

Many prior art devices which offer programmed learning appear in patents and publications as well as on the market. Some of these devices are elaborate and expensive multi-station devices with a computer control center at a remote location. A student at a station chooses the program desired which is presented and controlled by the central computer. Several of these devices use student answer responsive programmed learning storage media.

Other such prior art devices are typically multi-unit devices with a relatively small number of student stations and single teacher console devices which are under the control of a classroom teacher or other person in the immediate presence of the students. The teacher presents or causes to be presented an oral or displayed statement or question to which the students are to respond. After the student responses are registered, the teachers' console display shows which students responded correctly, which responded incorrectly and perhaps which did not respond at all. Some of these devices also keep tabulated data of ratios or percentages of right versus wrong responses and no responses. Scrutinizing this data, the teacher makes a decision whether to go forward to another topic, to give a similar question, or to give more instructions on the topic. Several of the disadvantages of such a system are readily apparent. All the students are forced to go at the same speed. Although a student can be having trouble learning a certain topic, he can get no further instruction on it since only a very few students may have given incorrect answers to the question (s) on that topic. This same student may have to waste time repeating another topic with others who did not previously learn it although he himself may know it well. In short, this system fails to solve many of the classical classroom instruction problems.

Yet another type of teaching machine is of the single unit student responsive programmed learning variety. This type is the predecessor of a preferred embodiment of the present invention. Such a device typically offers a viewing screen, programmed storage media; associated logic and a student response registering panel consisting of buttons, knobs or other type of selectors remote from the viewing screen. To operate the device, the student must read the projected scene, study the possible responses mentally, correlate a displayed multiple choice answer with a remotely located response mechanism, and push, pull or turn the response mechanism in order to register a response. The device then projects another scene in accordance with the response registered by the student and the program on the storage media.

The present invention overcomes many of the disadvantages of the prior art. It is reliable, simple and easy to use, even for a very young child for whom mentally correlating answers presented on a display screen with a remote answer registering device may pose a problem.

In accordance with the present invention, the student can respond to a presentation by indicating a response directly on the face of the display screen. There is no need to mentally correlate the response the student wants to make as presented on a viewer with a remote set of buttons, knobs or dials. Instead, as soon as a response comes to the mind of the student, almost as a reflex action the student can indicate it by pointing to a chosen response where it is presented on the viewing screen. There is no sidetracking of the student's mind since the sole attention of the student is on the displayed material to be learned. Particularly for a very young child, there is no response registering mechanism and procedure to be learned.

Furthermore, no elaborate complex of computer control is needed to practice the present invention although it may be incorporated into such computerized systems. Additionally, the instant invention is comparatively inexpensive and therefore readily available to the average school and student.

Since every student has a personal, complete programmed instructional console, every student can progress as fast or as slow over the various parts of the material as personal background dictates. Every student can learn each topic at optimum speed since students will not be bored with going over material already known or learn little of material too rapidly presented by a classroom instructor or instruction controlled teaching machine.

Additionally, in accordance with the present invention, any number of known teaching modes may be practiced. Remedial subroutines may be programmed into the instructional material that may be presented only to those needing it. Branching may also be incorporated into the program. This technique presents a topic of learning material, and a multiple-choice question thereon. Depending on the correctness of the student's response, a new topic or a needed variety of remedial sequences or subroutines may be presented. After the student who needs it completes the remedial matter and is satisfactorily retested on the topic, the student proceeds back into the main instructional sequence.

Straight forward timed or untimed testing can also be administered with the student answers being registered on a permanent or temporary record.

Correct and incorrect response lights can be used. Temporary or permanent response records can be made to provide the student and teacher with a report on the student's progress.

Auxiliary reward and "punishment" features such as response indicating lights, bells and buzzers may be incorporated to retain the interest of young children.

Time for responding can be controlled and coaching frames can be incorporated into routines which take into consideration both the time for a student to respond and whether or not the response is correct.

Too, instructional presentations alone can be used wherein the student response serves to advance the next frame or the frames can be automatically sequenced. The device can also be used for entertainment and amusement as well as to play games against the machine or against other player(s).

The present invention is readily adaptable to existing teaching machines, and can be incorporated into many existing systems with minor changes or modifications thereto.

Audio tracks to aid the visual instructions and questions can be incorporated into the storage medium or in a separate auxiliary system synchronized with the visual display. Too, audio comments can be programmed as replies to student registered responses.

Throughout the specification, reference will be made to AND gates and OR gates in connection with the disclosed circuitry. It is understood that the output of an AND gate is true, or enabled, if and only if all inputs to said AND gates are true, and that the output of the AND gate is false if any one, or all, of the inputs to said AND gate are false. It is also to be understood that the output of an OR gate is true, or enabled, if any, or all, of the inputs to said OR gate are true, and that the output of the OR gate is false if, and only if, all of the inputs to said OR gate are false.

SUMMARY OF THE INVENTION

A preferred embodiment of the present invention is used on a rear projection viewer with a programmed media such as a microfilm strip having encoded frames thereon. The programmed media is not limited to microfilm, but can be any photographic storage media, videotape, cards, paper, plastic or other storage material which can be optically or electrically projected or directly read. The encoding and programming need not be included on the display frames but should be associated therewith and can be on, for example, an auxiliary magnetic or punched paper tape. The frames can be location address encoded to facilitate the requirements of branching, subroutine, and routine rerun programming which calls for frame skipping and out-of-frame sequence presentations in forward and reverse storage media running directions. For simplicity, efficiency and economy, among other reasons, microfilm is used with a preferred embodiment of the invention to be discussed below.

Alternatively, the viewing screen can be a television receiver tube face if a videotape or other televised programmed storage media is used. If a directly read storage media is used, an appropriate cabinet having a viewing window of transparent glass, plastic or merely an open or cut-out area can be used. A magnetic tape or other type programmed storage media can also be used with a cathode ray tube display screen and appropriate circuitry. Other well-known types of viewing screens suitable for use with the present invention will be apparent to those skilled in the art.

Positioned around a portion of the periphery of the viewing screen of the preferred embodiment are mirrors that intercept some of the light from, preferably, a projection lamp. However, as is normal in such a viewer, most of the light from the lamp passes through the displayed portion of the encoded frame. The mirrors direct the light as beams onto corresponding light beam photodetectors also positioned around a portion of the periphery of the encoding screen. Thus, the light beams form a grid-like pattern across the face of the screen and impinge onto corresponding photodetectors. When an encoded frame which calls for a student response is projected on the screen, the light paths are interrupted by a finger, pencil or other object to point to a student selected response on the screen. This causes some light beam or beams to be blocked so that some corresponding photodetector(s) receive no light. Associated circuitry is thereby enabled and the indicated response is correlated with the coded information on the frame. As a result, another frame is selected for display in accordance with the program and what student response was made. Too, the correctness of the response may be indicated to the student by a light, bell, buzzer, printed or punched record. In this manner, the student can learn at a flexible and personally optimum rate.

One object of the invention is to provide a teaching device which is controlled by student response indicated on the viewing screen by the student viewer.

Another object of this invention is to provide a teaching or testing device in which a response can be registered directly on the face of the viewing screen.

It is another object of this invention to provide a new teaching and/or testing device sufficiently simple to be operable by a small child.

Another object of this invention is to provide a teaching mechanism using indicator lights or grading counters that can be remote from the teaching device.

Still another object of the invention is to provide a teaching or testing device wherein there are no moving parts used in the answer registration and comparison systems.

Yet another object of the invention is to provide a teaching or testing device that is readily adaptable for use with many existing teaching systems.

A further object of the invention is to provide a teaching or testing device that is simple and compact.

Still other objects and advantages of the present invention will be readily apparent to those skilled in the art from the following description and appended claims.

DESCRIPTION OF THE DRAWINGS

Reference is now made to the accompanying drawings in which like reference numerals and characters designate like parts and wherein:

FIG. 1 is a simplified perspective view illustrating the apparatus of the present invention with a portion of the housing partially broken away;

DESCRIPTION OF THE PREFERRED EMBODIMENT

Figure 2A:
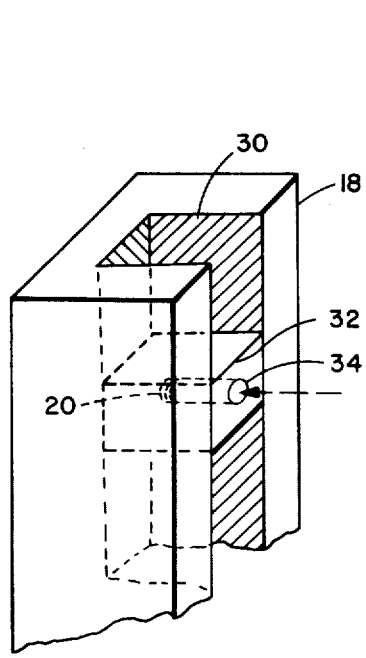
FIG. 2a is a simplified perspective view of a portion of the screen frame showing one photodetector.

Referring now to FIG. 1, a preferred embodiment of the teaching device of the present invention is generally referred to by the numeral 10, and is enclosed within a housing 12 on base 11. Arranged inside of housing 10 is programmed media 13 which is preferably microfilm having encoded frames thereon. The front face 14 of housing 12 contains a rear projection viewing screen 16 that is preferably fabricated of a translucent material. Arranged around the periphery of screen 16 is a rectangular frame 18 having a recess 30 in which are mounted photodetector retainers 32 containing slideably mounted photodetectors 20–A through 20–F. Also mounted in the recess 30 of frame 18 are mirrors 22 as shown in FIG. 2b which are preferably placed at approximately 45° to front face 14. In the embodiment shown in FIG. 1, six photodetectors 20–A through 20–F are shown, but it will be understood that any reasonable number can be used. The manner in which photodetectors 20–A through 20–F and mirrors 22 are mounted in frame 18 will be discussed in detail hereinbelow with reference to FIGS. 2a and 2b. A preferred format for a frame of programmed storage media 13 is shown in FIG. 3. Programmed storage media 13 is positioned for movement through a scanning or reading station by a film gate 17. Arranged between screen 16 and programmed media 13 is projection lens 26 which is mounted to housing 12 in optical alignment with the gate 17 and screen 16. Projection lamp 28 is connected to a suitable source of electrical potential (not shown) and emits light that passes through programmed media 13 and projection lens 26 to form an image on screen 16. It will be appreciated that the optical projection system selected is not part of the invention and alternative systems can be utilized by those skilled in the art. For purposes of clarity no further detail is shown. Correct and incorrect answer indicating lights 53, 55, 57 and 59 are shown preferably mounted on the base 11 but can be located in any area of the device viewable by the student. Removable modular printer 61 can be incorporated to provide a permanent printed record 63 of the student's performance. The printer need not be part of the teaching device but can be remotely positioned, such as at a teacher's desk.

Figure 2B:
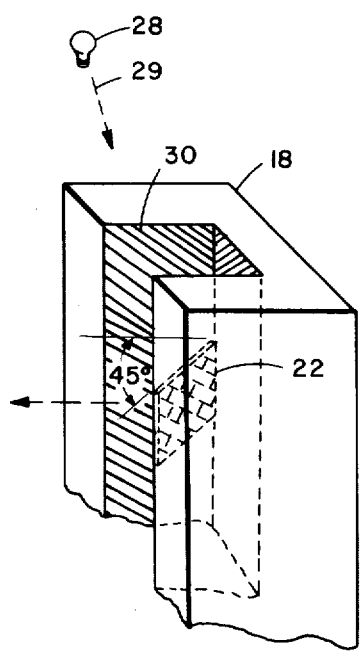
FIG. 2b is a simplified perspective view of a portion of the screen frame wherein a mirror is mounted at approximately 45° to the screen.
Figure 3:
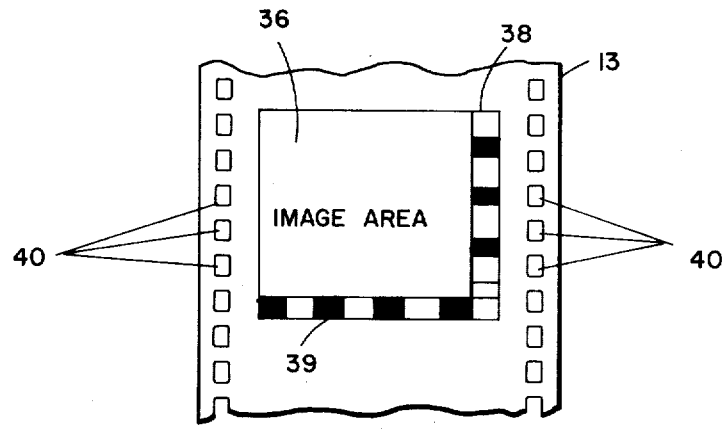
FIG. 3 is a planar view of a typical storage media frame format for use with a preferred embodiment of the invention showing the relative positions of image and information encoded areas.

Referring now to FIG. 2a, a simplified perspective view of a portion of the frame 18 in which photodetector retainers 32 are mounted is shown in the vicinity of photodetector 20–F. Frame 18 preferably has a rectangular recess or U-shaped channel 30 therein in which photodetector retainer 32 is slideably mounted. Photodetector retainer 32 has a cylindrical hole 34 therein at the bottom of which photodetector 20–F is located and is connected by wires (not shown) to associated logic circuitry. Examplary logic circuitry is discussed hereinbelow with reference to FIGS. 4 and 5. Cylindrical hole 34 acts as a light baffle for the light incident on photodetector 20–F, to insure that a selected light beam 29 from projection lamp 28 reflected from mirror 22 reaches photodetector 20–F, and that no appreciable ambient room light falls on photodetector 20–F. Photodetector retainer 32 can be made of black Lucite, metal, or other opaque material. The mounting of the remaining photodetectors is similar to that of photodetector 20–F which is used as an example.

Turning now to FIG. 2b, the part of frame 18 devoted to holding mirrors 22 in rectangular recess 30 is shown. Frame 18 is preferably made of Lucite, glass or other transparent material. The portion of frame 18 holding the mirror can also be L-shaped and opaque although a transparent U-shaped recess 30 is shown. Too, the frame 18 need not be transparent if portions between the mirror and the light incident thereon from source 28 are cut out. However, the use of a transparent frame enables easy changing of mirror positions, adding mirrors or eliminating them. Alternatively the mirrors need not be individually positionable and two sides of the screen can have continuous strip mirrors mounted there with photocells located on the other respective opposite two sides. Beam selection would then be by the retainers 32 with holes 34 containing the photocells. Other types of photodetectors and mirror mountings which can be substituted for those shown will be apparent to those skilled in the art.

Prisms or other reflecting bodies can be substituted for the mirrors. A separate light source can be used to establish the beams or individual beam sources. Fiber optics can be used to provide beam sources. An advantage of the preferred embodiment is that mirrors are inexpensive and efficient use is made of the frame illuminating source, adding to the simplicity and efficiency of the apparatus embodying the invention.

Referring now to FIG. 3, a possible format for a frame of programmed media 13 is shown in which such media is a film 13 having an image area 36, encoded areas 38 and 39 and perforations 40. Encoded areas 38 and 39 correspond to photodetector positions on two sides of rectangular frame 18 seen in FIG. 1.

Operation of the device is best understood with reference to FIGS. 1, 3, 4 and 6. Light rays A–F originate from projection lamp 28 and pass through programmed media 13 and projection lens 26 to reflect from the surface of mirrors 22 and impinge upon photodetectors 20-A through 20–F respectively. When an object such as a finger is placed in a position to interrupt the light paths to, preferably, at least two of the photodetectors, an electric circuit connected to the photodetector is activated, as will be discussed hereinbelow with reference to FIG. 4. By use of the proper code in coded areas 38 and 39 of programmed media 13 seen in FIG. 3, one or more photodetectors can be blocked, reducing the number of intersecting beams under consideration for that particular frame of programmed media 13.

Figure 4:
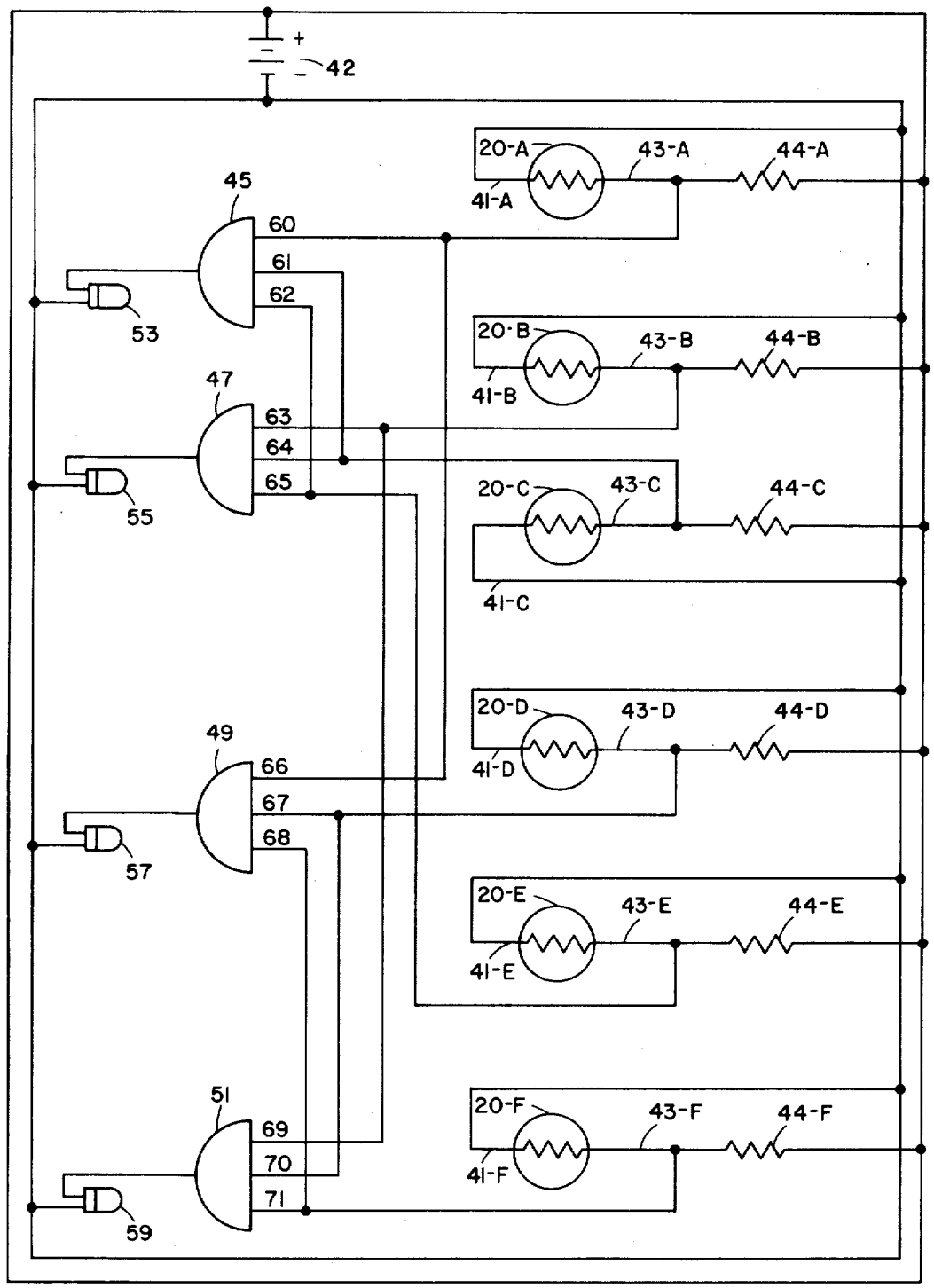
FIG. 4 is a simplified schematic diagram of a logic circuit that can be used in practicing the invention.

Referring now to FIG. 4, a circuit is shown that can be used with the teaching device shown in FIG. 1. Leads 41–A through 41–F of photodetectors 20–A through 20–F, respectively, are connected through resistors 44–A through 44–F, respectively, to the positive terminal of a DC voltage supply 42. Lead 43–A of photodetector 20–A is connected to an input terminal 60 of AND gate 45, and to input terminal 66 of AND gate 49. Lead 43–B of photodetector 20–B is connected to input terminal 63 of AND gate 47 as well as to input terminal 69 of AND gate 51. Lead 43–E of photodetector 20–E is connected to input terminal 65 of AND gate 47 and to input terminal 62 of AND gate 45. Lead 43–F of photodetector 20–F is connected to input terminal 71 of AND gate 51 and also to input terminal 68 of AND gate 49.

The output leads from AND gates 45, 47, 49 and 51 are connected to the negative terminal of DC voltage supply 42 through individually associated lamps 53, 55, 57 and 59 respectively.

Assume that the placing of a finger at the intersection of light beams A and C (see FIG. 1) represents the correct response to the question posed by the projected image on screen 16. The encoded area 38 on programmed media 13 causes no light to reach photodetectors 20–E and 20–F. Therefore, photodetectors 20–A, 20–C, 20–E, and 20–F receive no light. The resistances of photodetectors 20–A, 20–C, 20–E and 20–F are therefore higher than the resistance of photodetectors 20–B and 20–D. The voltage drops across resistors 44–B and 44–D are therefore greater than the voltage drops across resistors 44–A, 44–C, 44–E and 44–F. The voltage of input terminals 60, 61, and 62 of AND gate 45, input terminals 64 and 65 of AND gate 47, input terminals 66 and 68 of AND gate 49, and input terminal 71 of AND gate 51 is higher than the voltages at input terminal 63 of AND gate 47, input terminal 67 of AND gate 49, and input terminals 69 and 70 of AND gate 51. AND gate 45 is enabled, causing lamp 53 to light. AND gates 47, 49 and 51 are not enabled. Therefore, lamps 55, 57 and 59 remain unlit. The lighting of lamp 53 signifies that the proper answer has been given. As directed by the encoded frame in accordance with the response registered, electronic devices well known in the art can then sequence the tape to the next encoded frame called for by the program.

Assume now that the user does not choose the proper answer since his finger is placed over the intersection of light beams B and C (see FIG. 1). The encoded area 38 on programmed media 13 again causes no light to reach photodetectors 20–E and 20–F, and the following sequence of events occurs. Photodetectors 20–B, 20–C, 20–E, and 20–F receive no light. Their resistances are now higher than the resistances of photodetectors 20–A and 20–D. The voltage drops across resistors 44–A and 44–D are therefore greater than the voltage drops across resistors 44–B, 44–C, 44–E and 44–F. The voltages at input terminals 61 and 62 of AND gate 45, input terminals 63, 64 and 65 of AND gate 47, input terminal 68 of AND gate 49, and input terminals 69 and 71 of AND gate 51 are higher than the voltages at input terminal 60 of AND gate 45; input terminals 66 and 67 of AND gate 49, and input terminal 70 of AND gate 51. AND gate 47 is therefore enabled, causing lamp 55 to light. AND gates 45, 49 and 51 are not enabled, so lamps 53, 57 and 59 remain unlit. The lighting of lamp 55 signifies that a wrong answer has been given and, in accordance with the code on the displayed frame and the response operator registered, another frame is displayed.

Figure 5:
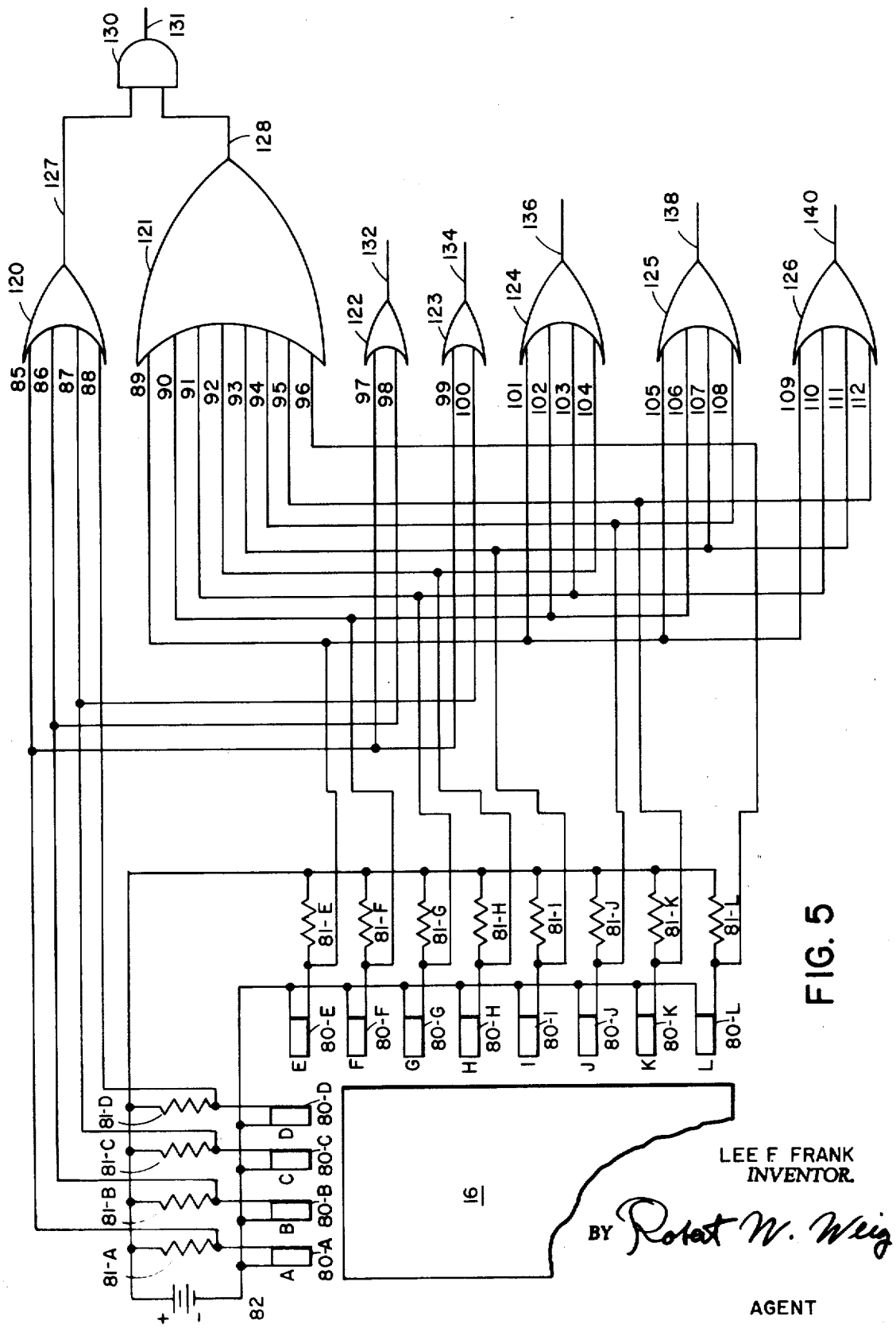
FIG. 5 is a simplified schematic diagram of another logic circuit that can be used in practicing the invention.

Referring now to FIG. 5, circuitry is shown that can be used with a teaching device incorporating the present invention utilizing 12 photodetectors 80–A through 80–L and yielding 32 possible light intersections. The negative lead of every photodetector 80–A through 80–L is connected to the negative terminal of DC voltage supply 82. The positive leads photodetectors 80–A through 80–L are connected through respective resistors 81–A through 81–L to the positive terminal of DC voltage supply 82.

Positive leads from photodetectors 80–A are connected to input terminals 85, 97 and 99 of OR gates 120, 122 and 123 respectively. The positive terminal of photodetector 80–B is connected to input terminals 86 and 98 of OR gates 120 and 122, respectively. Positive leads from photodetector 80–C are connected to input terminals 87 and 100 of OR gates 120 and 123, respectively. The positive terminal of photodetector 80–D is connected to input terminal 88 of OR gate 120. The positive terminal of photodetector 80–E is connected to input terminals 89, 101, 105 and 109 of OR gates 121, 124, 125 and 126, respectively. A positive lead from photodetector 80–F is connected to input terminal 90 of OR gate 125. The positive terminal of photodetector 80–G is connected to input terminals 91, 103 and 110 of OR gates 121, 124 and 126, respectively. The positive terminal of photodetector 80–H is connected to input terminal 92 of OR gate 121 and to input terminal 104 of OR gate 124. The positive terminal of photodetector 80–I is connected to input terminals 93, 107 and 111 of OR gates 121, 125 and 126, respectively. The positive terminal of photodetector 80–J is connected to input terminal 94 of OR gate 121 and to input terminal 108 of OR gate 125. Positive leads from photodetector 80–K are connected to input terminal 95 of OR gate 121 and to input terminal 112 of OR gate 126. The positive terminal of photodetector 80–L is connected to input terminal 96 of OR gate 121. OR gates 120 and 121 input to AND gate 130 by lines 127 and 128, respectively.

The purpose of OR gate 120 is to detect if any vertical beam of light has been blocked, that is, if any one of photodetectors 80–A, 80–B, 80–C or 80–D has been darkened. Placing a finger on screen 16 so that no light reaches photodetector 80–A makes the resistance of photodetector 80–A higher than the resistance of any of the photodetectors 80–B, 80–C or 80–D. The voltage drop across resistor 81–A is less than the voltage drop across any of the resistors 81–B, 81–C or 81–D. Input terminal 85 experiences a higher voltage than input terminals 86, 87, or 88 of OR gate 120. The output of OR gate 120 over line 127 is hence energized, signifying that one of the vertical light beams has been interrupted. Analogous analyses can be made for when any of the photodetectors 80–B, 80–C or 80–D receive no light.

The function of OR gate 121 is to determine if any horizontal beam of light is blocked, that is, if any of photodetectors 80–E, 80–F, 80–G, 80–H, 80–I, 80–J, 80–K or 80–L has been darkened. Placing a finger on screen 16 so that no light reaches photodetector 80–E cause the resistance of photodetector 80–E to become higher than the resistance of any of the photodetectors 80–F, 80–G, 80–H, 80–I, 80–J, 80–K or 80–L. The voltage drop across any of the resistors 81–F, 81–G, 81–H, 81–I, 81–J, 81–K or 81–L, and hence the voltage appearing at input terminal 89 of OR gate 121 is higher than the voltage appearing at input terminals 90, 91, 92, 93, 94, 95 or 96 thereof. Line 128 is energized from OR gate 121 to signify that one horizontal light beam has been interrupted. Similar analyses can be made for any one of the photodetectors 80–F, 80–G, 80–H, 80–I, 80–J, 80–K or 80–L receiving no light.

To detect whether one intersection of horizontal and vertical light beams has been blocked, AND gate 130 is provided. Assuming line 127 is energized, signifying that any one of photoconductors 80–A through 80–D has been darkened, and also that line 128 is energized, signifying that any one of photoconductors 80–E through 80–L has been darkened, the output line 131 of AND gate 130 will be energized. Output 131 can be to an electric light such as 53, 55, 57 or 59 as shown in FIG. 1 to indicate that an answer has been given.

OR gate 122 is used to detect whether any beam of light on the left half of the screen has been blocked by determining whether either of photodetectors 80–A or 80–B has been darkened. If a finger is placed on screen 16 so that no light reaches photodetector 80–A, its resistance will be higher than the resistance of photodetector 80–B. The voltage drop across resistor 81–A will be then less than the voltage drop across resistor 81–B, and hence the voltage at input terminal 97 will be higher than the voltage at input terminal 98 of OR gate 122. Therefore, OR gate 122 outputs over line 132, to signify that the light beam directed at photodetector 80–A has been interrupted. A similar explanation can be made for when photodetector 80–B, which is also in the left half of screen 16 receives no light.

To detect if any beam of light in the left half of either the right or left half of the screen has been blocked, that is, if either of photodetectors 80–A or 80–C has been darkened, OR gate 123 is provided. A finger placed on screen 16 so that no light reaches photodetector 80–A raises the resistance of photodetector 80–A so that it is higher than the resistance of photodetector 80–C. The voltage drop across resistor 81–A is less than the voltage drop across resistor 81–C, and hence the voltage at input terminal 99 of OR gate 123 is higher than the voltage appearing at input terminal 100. An output from OR gate 123 over line 134 occurs, signifying that the light beam directed at photodetector 80–A has been interrupted. An analogous situation exists if photodetector 80–C, which is also in the left half of one of the halves of screen 16, is receiving no light.

OR gate 124 will determine whether any beam of light in the top half of screen 16 has been blocked, that is, if any one of photodetectors 80–E, 80–F, 80–G, or 80–H has been darkened. If a finger has been placed on screen 16 so that no light reaches photodetector 80–E, the resistance of photodetector 80–E is higher than the resistance of any of photodetectors 80–E, 80–G, or 80–H. The voltage drop across resistor 81–E is therefore less than the voltage drop across any of the resistors 81–F, 81–G, or 81–H, and the voltage at input terminal 101 is higher than the voltage at input terminals 102, 103 or 104 of OR gate 124. The output of OR gate 124 over line 136 signifies that one of the light beams in the top half of screen 16 has been interrupted. Analogous analyses can be made for any one of the photoconductors 80–F, 80–G, or 80–H receiving no light.

OR gate 125 is used to detect if any beam of light in the top half of either the top or bottom half of screen 16 has been blocked, that is, if any one of photodetectors 80–E, 80–F, 80–I, or 80–J has been darkened. Assuming a finger has been placed on screen 16 so that no light reaches photodetector 80–E, the resistance of photoconductor 80–E will be higher than the resistance of any of the photodetectors 80–F, 80–I, or 80–J. The voltage drop across resistor 81–E is therefore less than the voltage drop across any of the resistors 81–F, 81–I or 81–J, and hence less than the voltage appearing at input terminal 106, 107, or 108 of OR gate 125. The output of OR gate 125 over line 138 will signify that one of the light beams in the top half of either the top or bottom half of screen 16 has been interrupted. A similar situation exists when one of the photodetectors 80–F, 80–I, or 80–J is receiving no light.

To determine if any beam of light in the top half of any quarter of the screen 16, divided horizontally, has been blocked, that is, if any one of photodetectors 80–E, 80–G, 80–I, or 80–K has been darkened, OR gate 126 is used. By placing a finger on screen 15 so that no light reaches photodetector 80–E, the resistance of photodetector 80–E is raised to be higher than the resistance of any of the photodetectors 80–G, 80–I, or 80–K. The voltage drop across resistor 81–E is now less than the voltage drop across any of the resistors 81–G, 81–I, or 81–K. The voltage at input terminal 109 is now higher than the voltage appearing at input terminals 110, 111, or 112, energizing OR gate 126 to output over line 140. This signifies that one of the light beams in the top half of any quarter of screen 16, divided horizontally, has been interrupted. The explanation presented hereinabove is based upon the assumption that photodetector 80–E is receiving no light, and a similar description can be made for any one of the photodetectors 80–G, 80–I, or 80–K receiving no light.

The circuit shown in FIG,. 5 is capable of indicating 32 intersections. It will be appreciated by one skilled in the art that the addition of each additional OR gate doubles the number of defined positions. The number of photodetectors required is equal to two times the square root of the desired number of intersections, for example, 32 photodetectors are needed to indicate 256 intersections.

Figure 6:
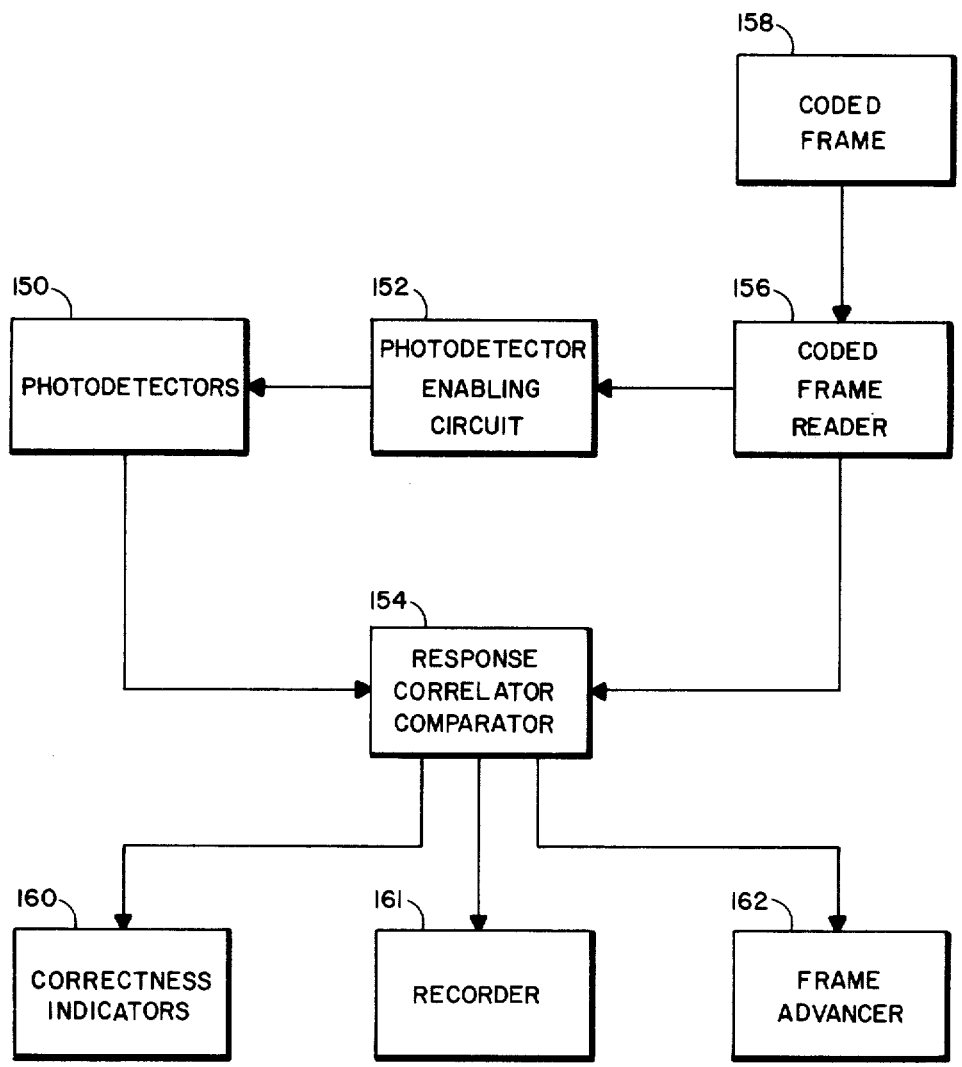
FIG. 6 is a block diagram of a teaching machine incorporating the present invention.

Referring now to FIG. 6, a block diagram of a teaching machine incorporating the present invention is shown. Photodetectors such as 20A–20F or 80A–80L are represented by block 150. Controlling inputs to the photodetectors is photodetector enabling logic represented by block 152 which can be that shown in FIGS. 4 or 5. Response correlating comparator 154 can also be that shown in FIGS. 4 and 5 or may be a program controlled logic as is well known by those skilled in the art. Comparator 154 compares the output of photodetectors 150 and frame code reader 156 for reading coded frame 158 which can be of the format shown in FIG. 3. The coding on the frame displayed controls through enabling circuit 152 which photodetectors in block 150 are operatively connected to comparator 154. Comparator 154 can output to student response correctness indicators such as lights 53, 55, 57 and 59, a response recorder 161 such as the printer 61 and a frame advancement mechanism 162.

Figure 7:
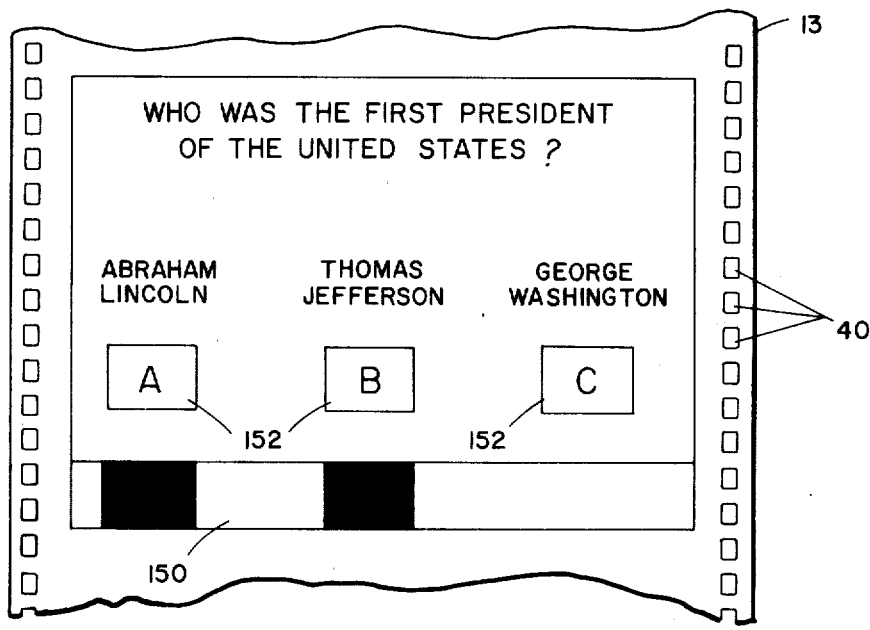
FIG. 7 is a planar view of an alternative storage media frame format.

With reference to FIG. 7, a storage medium 13 having perforations 40 and code format 150 which has several distinct answer columns or areas 152 rather than intersections can be used. A set of parallel light beams extending across the display screen between two opposite sides or, as is shown, from top to the bottom of frame 18 is provided. An interruption of one of the beams can be registered by a finger or other object. If one photodetector is enabled, when the light to it is cut off, a correct response is registered.

It is possible to make the system work with more than one correct answer to a question displayed on the screen. The electronics to do this can be provided as those to a preferred embodiment were to accommodate any such requirements.

While the invention has been particularly shown and described with reference to preferred embodiments thereof, it will be understood by those skilled in the art that various changes in form and detail may be made therein without departing from the spirit and scope of the invention.

I claim:

1. An operator responsive device having a projection lamp and screen for displaying information from a response encoded programmed storage medium bearing encoding corresponding to the displayed information, said device comprising:

means for directing light from said lamp into light beams adjacent to and transversing said display screen;

photodetectors positioned to receive light from said light beams provided such light beams remain uninterrupted by an operator response;

circuit means operatively connected to the photodetectors and responsive to the encoded medium for comparing an operator response to the encoding which corresponds to the information displayed; and means operatively connected to said circuit means for producing signals representative of the result of comparisons made by said circuit means.

2. The device of claim 1 wherein said light beam forming and directing means comprises means for reflecting light beams adjacent to and transversing said display screen.

3. A teaching machine having a projection lamp and screen for displaying information from a response encoded programmed media containing questions and encoded answers stored thereon, said machine comprising:

photodetectors positioned to receive light directed across the front of said display screen;

means for illuminating said photodetectors with light from said lamp, a student response being indicated by the interruption of light impinging on at least one of said photodetectors;

means for indicating the correctness of a student response; and means operatively connected to said photodetectors for comparing the encoded answer for the displayed question with the student response and for activating said indicating means.

4. The teaching machine of claim 3 wherein said light comprises a grid of light beams across and closely spaced from the front face of said display screen.

5. A display device having a projection lamp, a media moving mechanism and a screen for displaying information from a response encoded programmed media, said device comprising:

means for directing light from said projection lamp across the face of said screen;

photodetectors positioned to receive said light having outputs in accordance with the amount of light impinging thereon; and circuit means for comparing the outputs of the photodetectors with the encoding on said media corresponding to the information displayed, whereby upon interruption of the light falling upon at least one of the photodetectors, said circuit means actuates said mechanism to move said media in accordance with the result of the comparison.

6. A student responsive teaching machine having a projection lamp and screen for displaying information from a response encoded programmed storage media and a media moving mechanism, said machine comprising:

photodetectors having outputs corresponding to light impinging thereon;

means for illuminating the photodetectors with light from said lamp by directing light beams to form a grid-like pattern across the face of the screen, whereby a student response is registered by interruption of at least one of said light beams;

first circuit means for controlling said media moving mechanism;

second circuit means for comparing the encoding corresponding to the displayed information with the outputs of said photodetectors; and third circuit means for indicating the correctness of a student response, such that when a student response is registered, said second circuit means enables both said first circuit means to move the media in accordance with the comparison results and said third circuit means to indicate the correctness of the student response.

7. The machine of claim 6 wherein said third circuit means comprises means for indicating a correct response and means for indicating an incorrect response.

8. The machine of claim 6 wherein said third circuit means comprises means for recording the correctness of a student response.

9. An operator responsive device having a media moving mechanism, a projection lamp and a screen for displaying information from a response encoded programmed media, said device comprising:

photodetectors positioned to receive light beams from the lamp directed transversely across and adjacent said screen;

means for illuminating said photodetectors with light from said lamp;

first circuit means associated with said photodetectors for providing an output responsive thereto;

second circuit means responsive to the encoding on the media corresponding to the displayed information for providing an output responsive thereto; and comparison means for comparing the outputs of said first and second circuit means and for actuating the media moving mechanism in accordance with the result of the comparison, such that when information is displayed and a response is registered by an operator initiated interruption of at least one of said light beams, said media moving mechanism is actuated and said media is moved in accordance with the program and the operator response.

10. The device of claim 9 further comprising means for indicating a correct response operatively connected to said comparison means.

11. The device of claim 9 further comprising means for indicating an incorrect response operatively connected to said comparison means.

12. The device of claim 9 further comprising means for recording the response.

13. The method of using a teaching machine having a projection lamp and screen for displaying information from response encoded programmed media, said method comprising:
  displaying response encoded information on the screen;
  directing light beams from the lamp across the face of the screen to selectively located photodetectors;
  interrupting at least one light beam to enable the circuitry to advance the media in accordance with encoding and photodetector output affected by light beam interruption; and
  moving the media in response to comparison of encoding corresponding to the displayed information and photodetector output.

* * * * *